(12) United States Patent
Joos et al.

(10) Patent No.: US 7,406,742 B2
(45) Date of Patent: *Aug. 5, 2008

(54) VACUUM DEVICE/BLOWER

(75) Inventors: Steffen Joos, Murr (DE); Uwe Gaese, Stuttgart (DE)

(73) Assignee: Andreas Stihl AG & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/356,651

(22) Filed: Feb. 17, 2006

(65) Prior Publication Data

US 2006/0185114 A1 Aug. 24, 2006

(30) Foreign Application Priority Data

Feb. 19, 2005 (DE) .................. 10 2005 007 675

(51) Int. Cl.
*A47L 5/14* (2006.01)
(52) U.S. Cl. .......................................... 15/405; 15/339
(58) Field of Classification Search ................. 15/1.51, 15/330, 344, 405, 339, 327.5
See application file for complete search history.

(56) References Cited

U.S. PATENT DOCUMENTS

| 4,697,300 | A | * | 10/1987 | Warlop | 15/339 |
|---|---|---|---|---|---|
| 4,715,085 | A | * | 12/1987 | Johanson | 15/339 |
| 4,715,086 | A | * | 12/1987 | Johanson et al. | 15/339 |
| 4,866,565 | A | * | 9/1989 | Wray, Jr. | 15/339 |
| 5,150,499 | A | * | 9/1992 | Berfield | 15/339 |
| 2005/0039298 | A1 | * | 2/2005 | Joos | 15/405 |
| 2005/0229556 | A1 | * | 10/2005 | Haberlein | 55/360 |

\* cited by examiner

*Primary Examiner*—Theresa T Snider
(74) *Attorney, Agent, or Firm*—Robert W. Becker; Robert W. Becker & Associates

(57) ABSTRACT

An apparatus comprising a blower fan, a motor for driving the blower fan, a blower tube for conveying an air stream from the blower fan, and a potential compensation device that is electrically connected with the motor. The potential compensation device includes a charge compensation element having a free end that projects in an exposed manner into the air stream.

19 Claims, 8 Drawing Sheets

Fig. 12
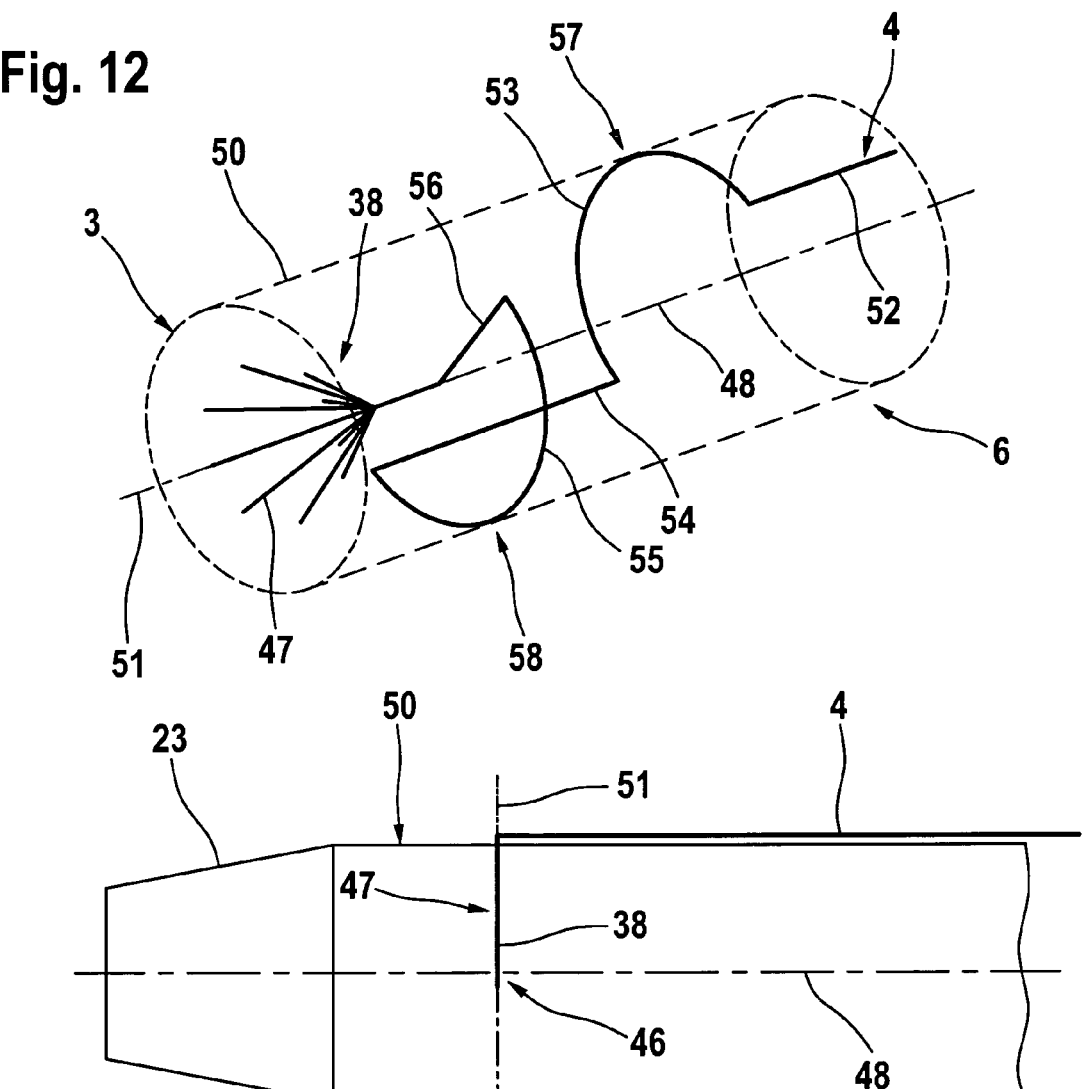
Fig. 13
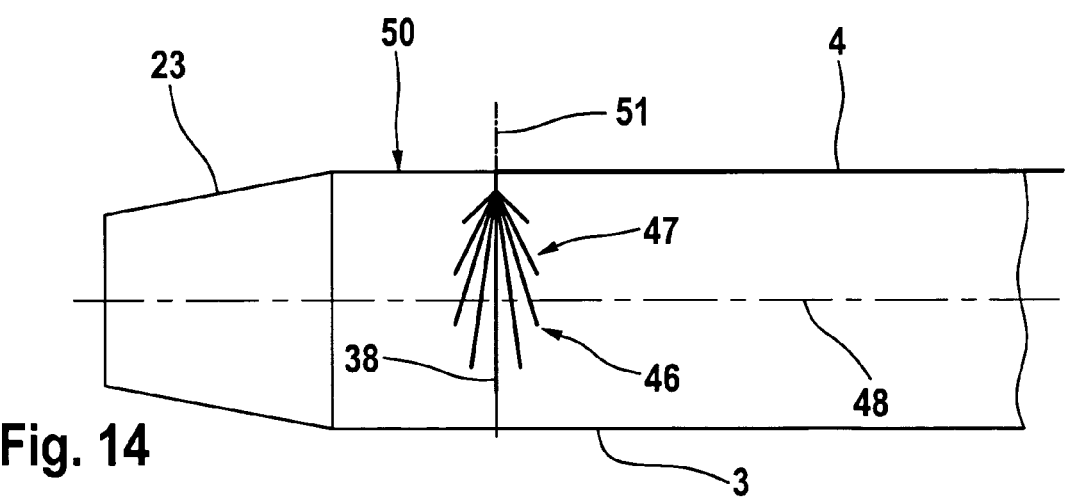
Fig. 14

US 7,406,742 B2

VACUUM DEVICE/BLOWER

The instant application should be granted the priority date of Feb. 19, 2005, the filing date of the corresponding German patent application 10 2005 007 675.0 filed Feb. 19, 2005.

BACKGROUND OF THE INVENTION

The present invention relates to an apparatus having a blower fan, in particular to a manually-guided portable blower, a combination vacuum device/blower, or the like.

Manually-guided blowers generate an air stream by means of a motor-driven blower fan. The air stream is directed to the desired application by means of a blower tube that extends from the blower fan. Such blowers are carried, for example, on the back, and are manually guided, and in this connection are used to blow fallen leaves into a pile. A vacuum or suction operation is also possible with a vacuum tube that is placed upon the intake opening of the blower fan. The blower can also be used as a sprayer, whereby material to be sprayed, such as a plant protection agent or granular material, is introduced into the blower tube. If such a blower has a venturi device and a collection bag, it can also be used as a nut collector or the like. The housing of the blower fan, the blower wheel, and in particular the blower tube are made of polymeric material which acts as an electrical insulator relative to the drive motor, which forms an electrical ground.

At an appropriate blower capacity, a relatively high flow velocity flows in the blower tube. This can lead to electrostatic charges under appropriate atmospheric conditions, and when dirt or dust particle laden ambient air is drawn in, in particular due to friction between the particles as well as with the fan wheel, the fan housing and with the wall of the blower tube. Contact with components of the blower can lead to undesired electrostatic discharges.

It is therefore an object of the present invention to improve a blower of the aforementioned general type in such a way that the formation of an electrostatic charge is prevented.

BRIEF DESCRIPTION OF THE DRAWINGS

This object, and other objects and advantages of the present invention, will appear more clearly from the following specification in conjunction with the accompanying schematic drawings, in which:

FIG. 12 is a perspective view of an embodiment having a potential compensation conductor that is bent from a spring wire and is retained in the blower tube;

FIG. 13 is a schematic illustration of an embodiment having a potential compensation conductor on the outer side, and a wire-shaped charge compensation element that projects radially into the blower tube;

FIG. 14 shows a variation having a potential compensation conductor integrated into the wall of the blower tube and a charge compensation element that is embodied in a broom-shaped manner and projects radially into the blower tube;

SUMMARY OF THE INVENTION

Figure 1:
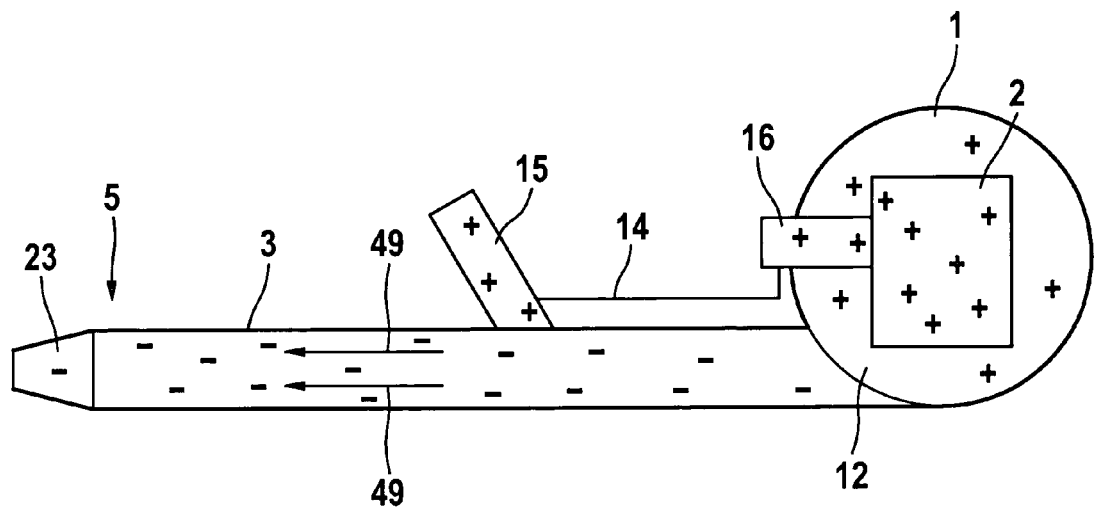
FIG. 1 is a diagrammatic illustration of the essential components of a blower pursuant to the state of the art.

To realize the object of the present application, a blower having a potential compensation device electrically connected with the motor is proposed, according to which the potential compensation device includes a charge compensation element, a free end of which projects in an exposed manner into the air stream generated by the blower fan. The charge compensation element can be disposed in the region of the blower spiral or other air-conveying elements of the apparatus, and is preferably provided in the region of the blower tube, i.e. in the region of the air stream that is guided by the blower tube. The charge compensation element, which is spatially separated from the blower tube, especially in the region of its free end, collects the charges that result in particular at the dust and dirt particles that are carried along in the air stream and in an electrically conductive manner equalizes or compensates the potential difference between the air stream and the electrical ground in the form of the motor. The free end is spaced relative to the blower tube, the wall thereof, nozzles, or the like, thus preventing a short circuit relative to the aforementioned components. A point discharge results within the air stream, which increases the effectiveness of the potential compensation.

Commonly assigned U.S. patent application Ser. No. 10/922,331 proposes a potential compensation device having as a charge compensation element a metallically bare potential compensation conductor that extends within the blower tube. Provided at the end thereof is a support spider of wire strands via which the potential compensation conductor is centrally fixed in the blower tube. Support legs of the spider are in electrical contact with the wall of the blower tube. No free ends that project into the air stream are provided.

The charge compensation element can be screwed directly to the motor and can project into the air stream close to the blower fan. Pursuant to an advantageous further development, the charge compensation element is disposed at least approximately in the region of the free end of the blower tube, and is electrically connected with the motor via a potential compensation conductor. This embodiment is based on the recognition that an electrostatic charge is caused by friction over the entire length of the tube. The charge compensation element collects the electrostatic charge at the location of the nearly greatest intensity and compensates or equalizes it with an appropriately great effectiveness. This effect can be further enhanced by the appropriate length of the potential compensation conductor which, if it extends on the inside of the blower tube, in conjunction with a metallically bare surface, can collect and shunt off at least a portion of the charge that is generated during the flow. The entire electrostatic charge that is generated can be at least nearly completely shunted off to the electrical ground, i.e. to the motor.

The charge compensation element can be disposed entirely within the blower tube, and advantageously projects at least via its free end out of the free end of the blower tube. The additional effect of the point discharge at the conductor tips of the spider is disposed at a location of as great a flow path as possible in order to compensate for as great a portion of the charge as possible.

Pursuant to an expedient embodiment, the charge compensation element is a flexible, resilient and in particular bare wire that is preferably formed of stainless steel. A reliable potential compensation having little mechanical sensitivity to abrasive effects from the dust particles or the like carried along in the air stream results.

The charge compensation element is advantageously formed by a plurality of wires grouped together in the manner of a broom and each having a free end. Such wires expediently form an electrically conductive spider that has legs that extend radially outwardly, relative to a longitudinal axis of the blower tube, in a ray-shaped manner. The broom or spider like arrangement of the wires extends nearly entirely through the flow cross-section. The thin legs can collect electrostatic charges of the particles over the entire flow cross-section without thereby adversely affecting the aerodynamics of the air stream in a significant way. In this connection, a central axis of the broom arrangement can expediently be disposed in the longitudinal direction or also transverse thereto.

For a good compromise between electrostatic effectiveness and mechanical sturdiness, an arrangement of the legs in a conical shape is expedient. In this connection, the legs are in particular disposed with a half conical opening angle of a minimum of approximately 15° and a maximum of approximately 80°. The flexible spider legs are disposed in the air stream in an elastically resilient manner, and extend over an adequately large flow cross-section even when they are deflected as a consequence of the dynamic pressure that is present.

Pursuant to an advantageous further development, the wires, which are grouped together in a broom-like manner, are formed by individual strands of an untwisted steel wire, whereby the steel wire is in particular the potential compensation conductor. The geometrically complex structure of potential compensation conductor and spider can, in a surprisingly simple manner, be monolithically produced from a twisted steel wire at a low manufacturing expense.

Pursuant to an expedient embodiment, the charge compensation element is positioned by means of a positioning ring that is disposed in the blower tube. The positioning ring can expediently centrally position the spider in the blower tube. An easy assembly results if the diameter of the positioning ring is slightly smaller than the inner diameter of the blower tube. A good charge collection results with low aerodynamic and mechanical stresses.

The positioning ring advantageously has at least one radially inwardly extending positioning arm that is provided with a snap clamp for the potential compensation conductor. A simplified assembly having a high retaining force results by pressing the potential compensation conductor into the snap clamp, where it is reliably held in a positive manner.

Pursuant to an advantageous embodiment, at least a portion of the potential compensation conductor extends on the inside of the blower tube. In this connection, the potential compensation conductor is expediently formed by a spring wire that in the region of its free end is bent to form a support location that is held in the blower tube in a wedged manner. The spring wire in particular has two support locations that are axially offset relative to one another. The support locations can be bent so as to be slightly over dimensioned relative to the inner diameter of the blower tube, as a result of which for assembly it is merely necessary to elastically compress the respective support location, and as a result of which the elastic spring forces reliably fix the potential compensation conductor in position. The rigidity of the spring wire can preferably be such that the wire is rigid enough to produce adequate wedging forces and to prevent a fluttering of the charge compensation element that is connected thereto. On the other hand, an adequate residual flexibility should be ensured for the assembly and for a certain ability to deflect, for example in conjunction with a pivotable blower tube, as a result of which it is possible to dispense with hinge or joint connections. The two support locations, which are axially offset relative to one another, in addition to a centering function also provide protection against tilting. A fluttering of the potential compensation conductor, and of the charge compensation element that is connected thereto, is reliably prevented. The disposition on the inside, and the thereby resulting flow in contact therewith, furthermore lead to a shared charge compensation of the potential compensation conductor.

It can be expedient for at least a portion of the potential compensation conductor to be integrated into a wall of the blower tube and/or for at least a portion to extend on the outside of the blower tube. The potential compensation conductor is protected against abrasion. The flow in the blower tube is not obstructed.

Further specific features of the present invention will be described in detail subsequently.

DESCRIPTION OF SPECIFIC EMBODIMENTS

Referring now to the drawings in detail, the diagrammatic illustration of FIG. 1 shows the essential components of a manually guided blower according to the state of the art. The blower has a blower fan 1, which is driven by a motor 2. In the illustrated embodiment, the motor 2 is an internal combustion engine, with the carburetor 16 thereof being indicated. An electric motor or the like can also be provided. The blower fan 1 is provided with a discharge bend or knee 12, which is adjoined by a blower tube 3 that continues from the blower fan 1. The blower tube 3 has a free end 5, on which is disposed a nozzle 23. An air stream 49 is conveyed out of the blower fan 1 through the discharge knee 12 and from there is conveyed through the blower tube 3 and the nozzle 23.

Mounted on the outer side of the blower tube 3 is a handle or hand grip 15 having control elements for the motor 2. A gas lever or cable 14, for example, leads from the control elements on the hand grip 15 to the carburetor 16. The gas cable 14 is electrically conductive, as a result of which the hand grip 15 as well as the motor 2 with the carburetor 16 have the same electrical potential. Due to friction of the particles that are carried along in the air stream 49 relative to one another as well as with the walls of the discharge knee 12 and of the blower tube 3, a negative electrostatic charge results in this region, which is indicated by minus signs. In contrast, the region of the motor 2 and of the hand grip 15 have a positive potential difference, which is indicated by plus signs. The negatively charged particles leave the blower tube 3 through the nozzle 23, as a consequence of which the positive charge of the motor 2 continuously increases during operation of the unit.

It has been shown that in particular in the hand grip 15, such a high potential difference between the gas cable 14 and the hand of the operator can result that an undesired electrical discharge is obtained.

Figure 2:
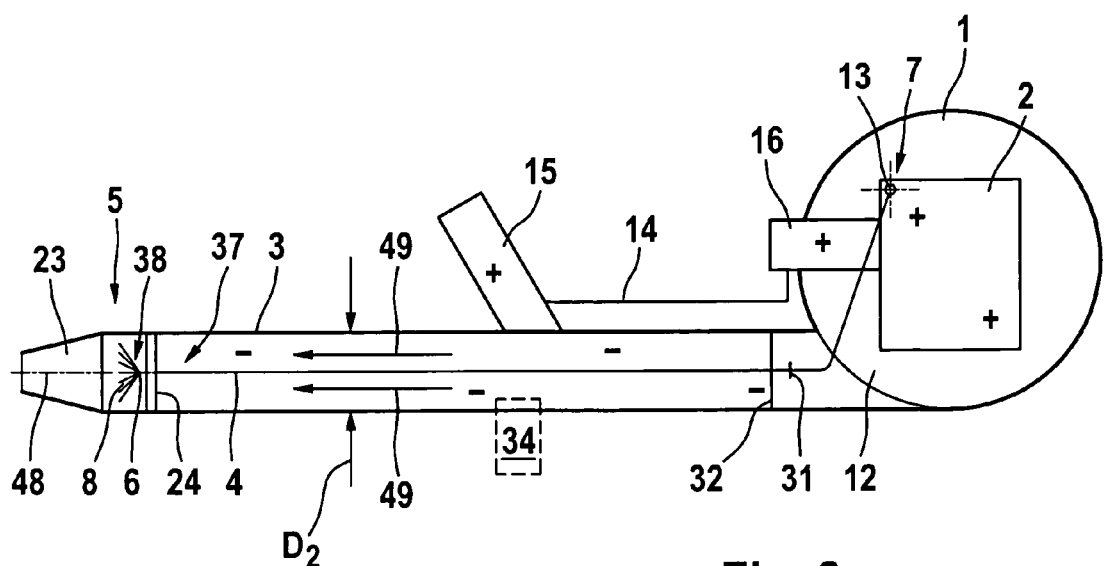
FIG. 2 shows the arrangement of FIG. 1 with a potential compensation conductor that extends through the blower tube, and with a charge compensation element that is centered in the blower tube end.

FIG. 2 shows the inventive further development of the arrangement of FIG. 1, and in particular by the provision of a potential compensation device 37. The potential compensation device 37 includes a potential compensation conductor 4 and a charge compensation element 38. The potential compensation conductor 4 extends on the inside of the blower tube 3, whereby the end 7 of the potential compensation conductor 4 is electrically conductively connected with the motor 2, while its opposite end 6 is electrically conductively connected with the charge compensation element 38. The charge compensation element 38 and the end 6 of the potential compensation conductor 4 are disposed in the air stream 49 in the region of the free end 5 of the blower tube 3. The opposite end 7 of the potential compensation conductor 4 is secured to the motor 2 in an electrically conductive manner via a motor mounting bolt 13.

The end 6 of the potential compensation conductor 4 that is remote from the motor 2 is centrally positioned in the blower tube 3, relative to its longitudinal axis 48, by means of a positioning ring 24, and is electrically insulated relative to the blower tube 3. In the illustrated embodiment, the charge compensation element 38 is embodied as a spider 8 which, together with the positioning ring 24, will be described in greater detail in conjunction with FIG. 7.

Between its two ends 6, 7, the potential compensation conductor 4 runs in an unsupported manner. In the region of its end 6, the potential compensation conductor 4 can also be screwed, riveted, or otherwise fixed in position or supported in some other suitable manner on or with the wall of the blower tube 3. Over their entire length, the potential compensation conductor 4 and the spider 8 have a plain or bare electrically conductive surface, and are made of stainless steel.

When an air stream 49 is formed in the blower tube 3, a portion of the electrostatic charge that results along the blower tube 3 is received over the entire length of the potential compensation conductor 4 and is compensated for by the electrical contact with the motor 2. A final charge reception in the air stream 49 is effected via the electrically conductive spider 8. In this connection, the spider 8 receives electrostatic charges from the air stream 49 over nearly the entire cross-sectional area thereof. A point discharge has a particular significance in this case, and will be discussed in conjunction with FIG. 7.

The potential compensation conductor 4, which extends in an unsupported manner between its two ends 6, 7, can be disposed in the blower tube 3 and in the discharge knee 12 in any desired manner, for example linearly or in a curved manner. It can also be expedient to guide the potential compensation conductor 4 to the motor 2 along the outer side of the blower tube 3. The blower tube is detachably inserted into the discharge knee 12 at a separation location 32 in the region of which, the potential compensation conductor 4 is also provided with a detachable separation location 31.

In the illustrated arrangement, the motor 2 and the carburetor 16 serve as an electrical ground connection, whereby via the potential compensation conductor 4 no, or at most a slight potential difference, indicated by plus and minus signs, results. Instead of the motor 2 or the carburetor 16, a metal housing or some other suitable electrical ground connection can also be provided. For this purpose, for example with power line-operated blowers, the ground wire of the power cable is suitable.

The illustrated blower is provided for blowing leaves or the like into a pile, and can also be used as a vacuum or suction device. As an option, an injector 34, which is indicated by dashed lines, can be provided on the blower tube 3. The blower is thus turned into a sprayer for spraying liquid material or into a duster for applying solid material in the form of dust, powder, granular material or the like, especially for plant protection material or the like, by introducing material that is to be sprayed or dusted into the blower tube 3 via the injector 34 and applying it via the blower tube 3. The illustrated arrangement can also be embodied as a small fruit collector for nuts, olives or the like, and will be described in greater detail in conjunction with FIG. 4.

Figure 3:
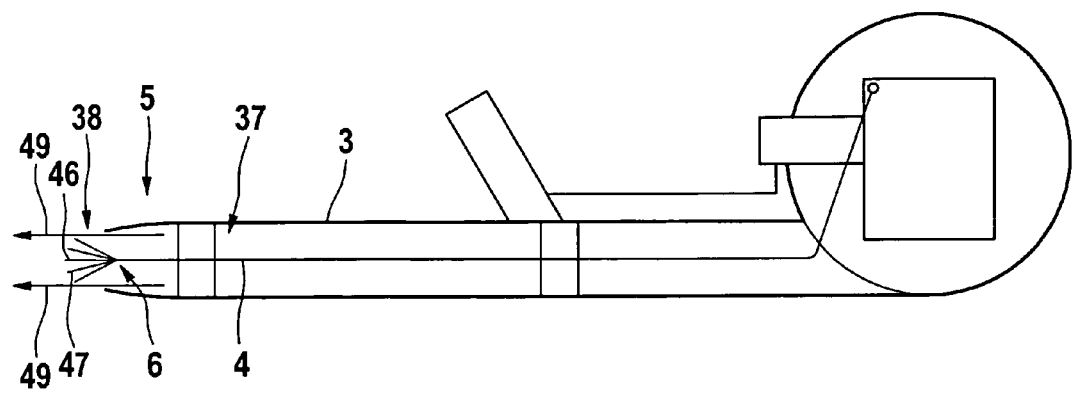
FIG. 3 shows a variation of the arrangement of FIG. 2 with a charge compensation element that projects out of the free end of the blower tube.

FIG. 3 shows a variation of the potential compensation device 37 of FIG. 2, according to which the potential compensation conductor 4 is guided through the blower tube 3 to the free end 5 thereof. At the free end 6 of the potential compensation conductor 4, a charge compensation element 38 is provided, which is formed by a plurality of wires 47 that are grouped together in the manner of a broom, and each of which has a free end 46. The wires 47 are guided outwardly through the nozzle 23 in the direction of flow, whereby their loose or free ends 46 project out of the free end 5 of the blower tube 3. It can also be expedient to dispose the charge compensation element 38 entirely within the blower tube, or downstream entirely externally of the blower tube. The wires 47, including their free ends 46, are disposed in an exposed manner in the air stream 49 and contact neither the blower tube 3 nor the nozzle 23. A support is effected by an electrically insulating positioning ring 24 in conformity with FIG. 2 that to facilitate illustration is not shown here. The remaining features also coincide with the arrangement of the embodiment illustrated in FIG. 2.

Figure 4:
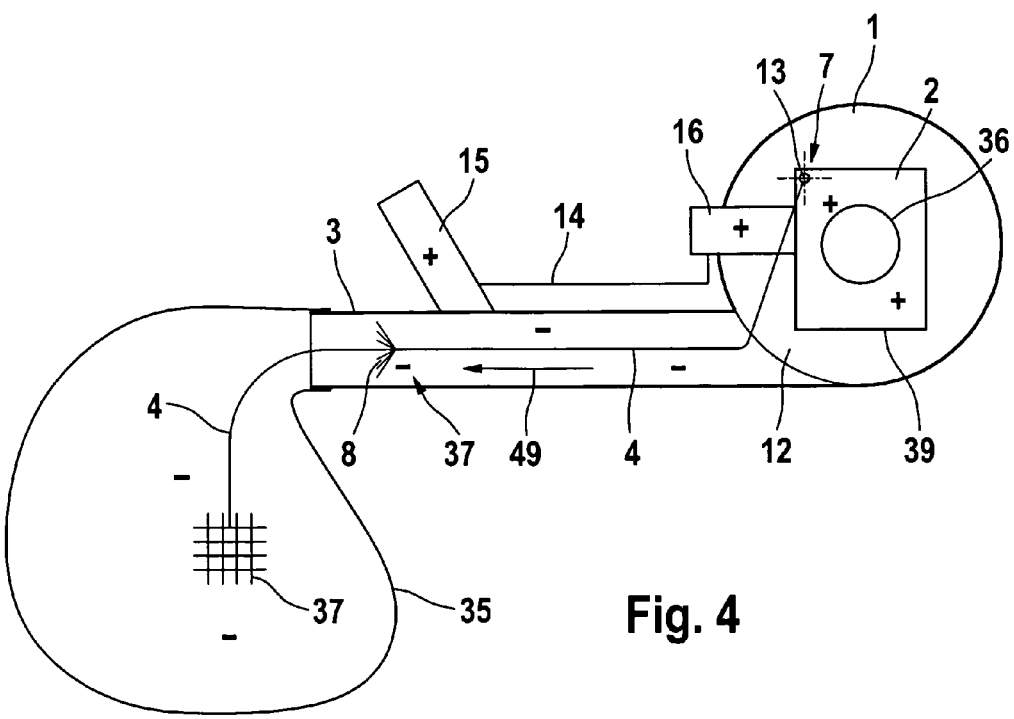
FIG. 4 shows an embodiment of the arrangement of FIG. 2 in a configuration as a small fruit collector.

FIG. 4 shows a variation of the arrangement of FIG. 2 in a configuration of a nut harvester. The free end of the blower tube 3 opens into a collection bag 35. By means of a central intake opening 36 of the blower fan 1, and a suction tube that is connected thereto and is not shown in greater detail, an air stream 49 can be drawn in and can be conveyed via the blower tube into the collection bag 35. By means of a non-illustrated suction device, for example in the form of a venturi device, which opens into the blower tube 3, nuts, olives or the like can be gathered up from the ground by suction and can be blown into the collection bag 35.

Extending within the blower tube 3, to within the collection bag 35, is the potential compensation conductor 4, which is connected with the motor 2 in an electrically conductive manner. In the illustrated embodiment, the potential compensation device 37, in addition to the potential compensation conductor 4 and the spider 8, also includes an electrically conductive fabric of the collection bag 35, which is electrically connected with the potential compensation conductor 4 and has woven-in metallically conductive threads.

A conductive foil coating or the like can also be disposed on the inner side of the collection bag 35, and together with the spider 8 can be connected with an electrical ground connection 39 of the vacuum device/blower via the potential compensation conductor 4. In all of the illustrated embodiments, the electrical ground connection 39 is formed by the motor 2. However, for this purpose it is also possible to provide, for example, the ground conductor of an electrical drive motor or the like. The remaining features and reference numerals of the illustrated embodiment coincide with those of FIG. 2.

Figure 5:
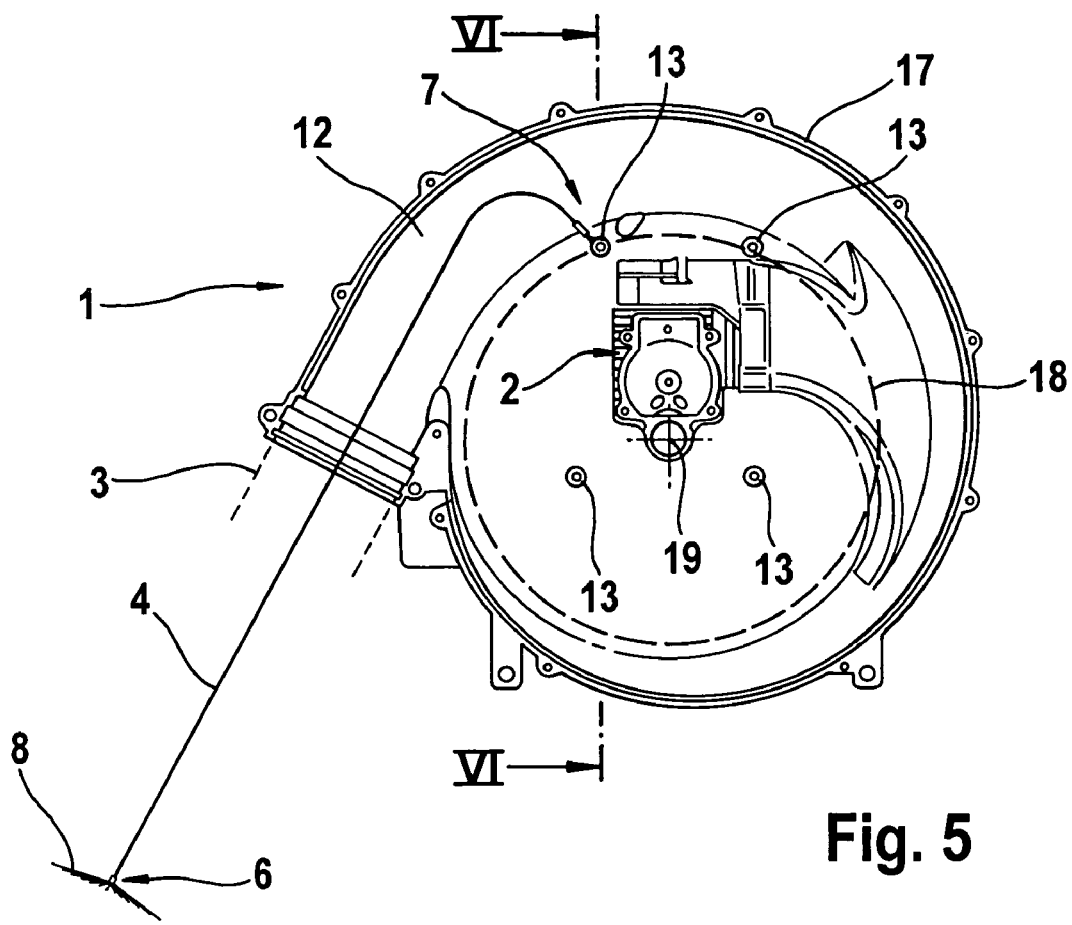
FIG. 5 shows details of the fan housing of the arrangement of FIGS. 2 and 4.

The side view of FIG. 5 shows details of the arrangement of FIGS. 2 and 4 in the region of the blower fan 1. In the illustrated embodiment, the blower fan 1 is embodied as a radial-flow fan having a spiral shaped fan housing. Shown at the fan housing is the inner side of a half shell 17, in which an indicated fan wheel 18 can be rotatably driven via the motor 2 about an axis of rotation 19. The spiral fan housing merges via a discharge bend or knee 12 into the indicated blower tube 3.

The motor 2 is disposed on the back side of the half shell 17 and is fixed in position by means of motor mounting bolts 13 that extend through the end wall of the half shell 17. The potential compensation conductor 4 extends on the inside through the discharge knee 12 of the blower fan 1 and within the fan 1, in the region of the discharge knee 12, at the corresponding motor mounting bolts 13 disposed at that location, is connected with the motor 2 in an electrically conductive manner.

Figure 6:
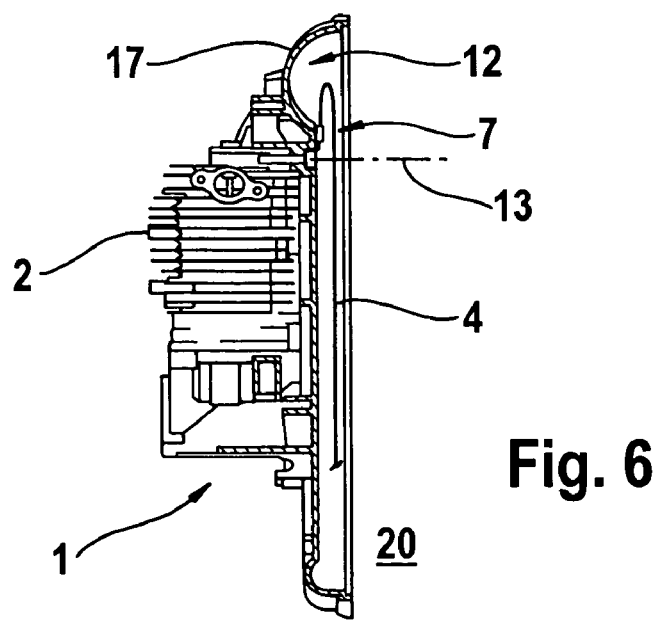
FIG. 6 is a cross-sectional view of the arrangement of FIG. 5.

FIG. 6 shows a cross-sectional view of the arrangement of FIG. 5, with the section being taken along the line VI-VI thereof. The motor is fixed in position on the outer side of the half shell 17 via the motor mounting bolts 13, which extend through the side wall of the half shell 17.

On the inside 20 of the fan housing that is opposite the motor 2 an air stream forms during operation that extends through the discharge knee 12 and from there through the blower tube 3 (FIG. 5). In the region of its end 7, the potential compensation conductor 4 is disposed on the inside 20 of the blower fan 1, and at that location, in the region of the discharge knee 12, is screwed or bolted via the mounting bolts 13 in an electrically conductive manner with the motor 2 that is disposed on the outside.

Figure 7:
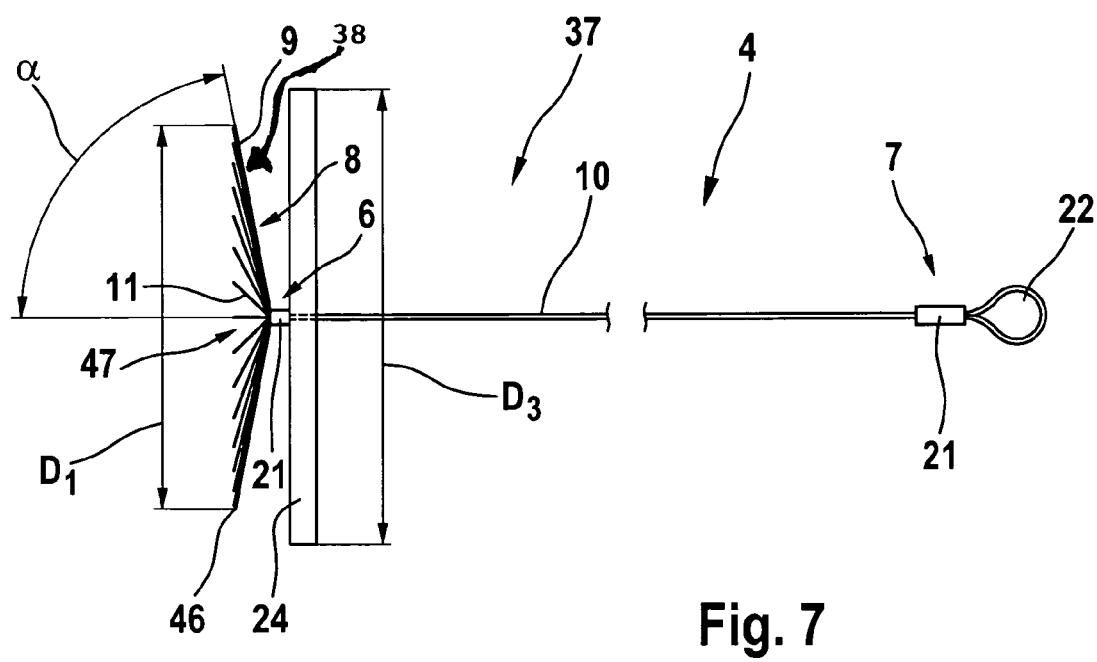
FIG. 7 shows details of the charge compensation element with a spider and a positioning ring.

FIG. 7 shows details of the potential compensation conductor 4 of FIGS. 2 and 4. The potential compensation conductor 4 can be a rigid wire, a metallic foil band, a flat metallic fabric, or the like. It would also be possible to use electrically conductive synthetic materials, especially carbon-containing materials. In the illustrated embodiment, the potential compensation conductor is embodied as a flexible stainless steel wire 10 having a number of twisted strands 11. In the region of its end 7 on the motor side, the steel wire 10 is formed into an eye 22 and is held via a squeezing sleeve 21. The eye 22 is provided for coupling with the motor mounting bolts 13 (FIGS. 2 and 4). A cable shoe or similar terminal can also be provided on the end 7 on the motor side.

Provided at the opposite end 6 of the potential compensation conductor 4 is a further squeezing sleeve 21, beyond which the strands 11 of the steel wire 10 are untwisted and are bent outwardly in a conical fashion. The untwisted strands 11 form the wires 47 with the free ends 46 of the charge compensation element 38 that is shown in FIGS. 2 to 4, 12 and 14. By means of the radial bending, it is possible to bring about a spreading of the wires 47 in the manner of a broom. In the embodiment shown here, the conical shape of the bent-out strands 11 has a half conical angle α of about 80°. A smaller half conical opening angle α can also be expedient.

In the illustrated embodiment, the steel wire 10 has nineteen individual strands 11 that in the conically shaped bent-out region form elastically resilient legs 9 of the spider 8. Separate or additional legs 9 can also be provided. The spider 8 has an outer diameter $D_1$ that in the illustrated unstressed state is smaller than an inner diameter $D_2$ of the blower tube 3 (FIG. 2). An electrically insulating spacing of the free ends 46 relative to the inner wall of the blower tube 3 results. A point discharge having a high compensation effect takes place at the respective free ends that are disposed in the blower air stream.

Also provided in the region of the free end 6, upstream of the spider 8, is the positioning ring 24 of the potential compensation conductor 4. The positioning ring 24 has an outer diameter $D_3$ that is slightly less than the inner diameter $D_2$ of the blower tube 3 (FIG. 2). In this connection, the free end 6 of the potential compensation conductor 4 is positioned, with radial play, approximately centrally in the blower tube 3.

Figure 8:
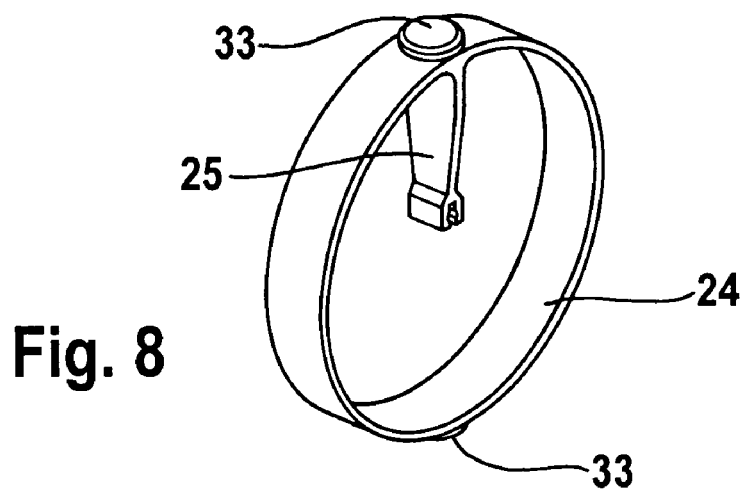
FIG. 8 is a perspective illustration of the positioning ring of FIG. 7.

The positioning ring 24 of FIG. 7 is shown in a perspective view in FIG. 8. The positioning ring 24 has a radially inwardly extending positioning arm 25 for holding the potential compensation conductor 4 (FIG. 7). Provided on the radially outer side are two diametrically oppositely disposed detents 33 that catch in appropriate, non-illustrated arresting openings of the blower tube 3 (FIG. 2), thereby effecting a positive fixing in position of the positioning ring 24 in the blower tube 3, not only in the peripheral direction, but also in the axial direction.

Figure 9:
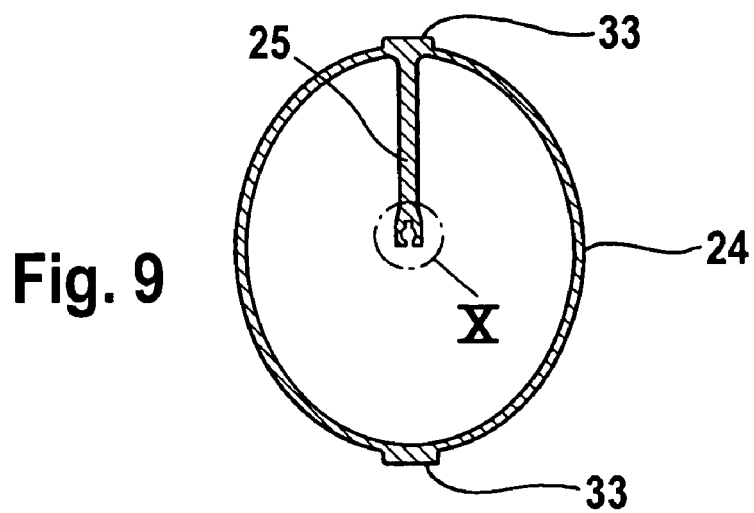
FIG. 9 is a cross-sectional view of the positioning ring of FIG. 8.

FIG. 9 shows a cross-sectional view of the positioning ring 24 of FIG. 8, according to which the positioning ring 24 has an elliptical cross-sectional shape that deviates from the circular shape. When the positioning ring 24 is mounted in a blower tube having a circular cross-section, the positioning ring 24 is brought into the appropriate circular shape in an elastically resilient manner, as a consequence of which the positioning ring conforms to the inner wall of the blower tube. The positioning ring 24 is thereby disposed in the region of the low flow velocity near the wall. The main portion of the air stream is not obstructed. It could also be expedient to embody the blower tube with an elliptical or other cross-section that deviates from the circular shape. In this connection, the previously defined diameters apply to any, yet always the same, radial direction of the elliptical or otherwise un-round cross-section. It could also be expedient to dispense with the detents 33. As a consequence of the dynamic pressure that is present, the positioning ring 24 can migrate in the direction of flow, thereby holding the potential compensation conductor. Its tendency to flutter can be reduced.

Figure 10:
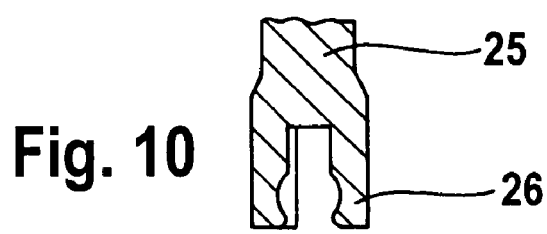
FIG. 10 shows the encircled detail X of FIG. 9 with an enlarged snap clamp for the potential compensation conductor.

The enlarged view of FIG. 10 shows the encircled detail X of FIG. 9, according to which a snap clamp 26 is provided on the free end of the positioning arm 25. The snap clamp 26 is centrally disposed, relative to the cross-sectional shape of the positioning ring 24 (FIG. 9), and is provided for the arresting, positive securement of the potential compensation conductor 4 (FIG. 7) coaxially relative to the blower tube 3 (FIG. 2).

Figure 11:
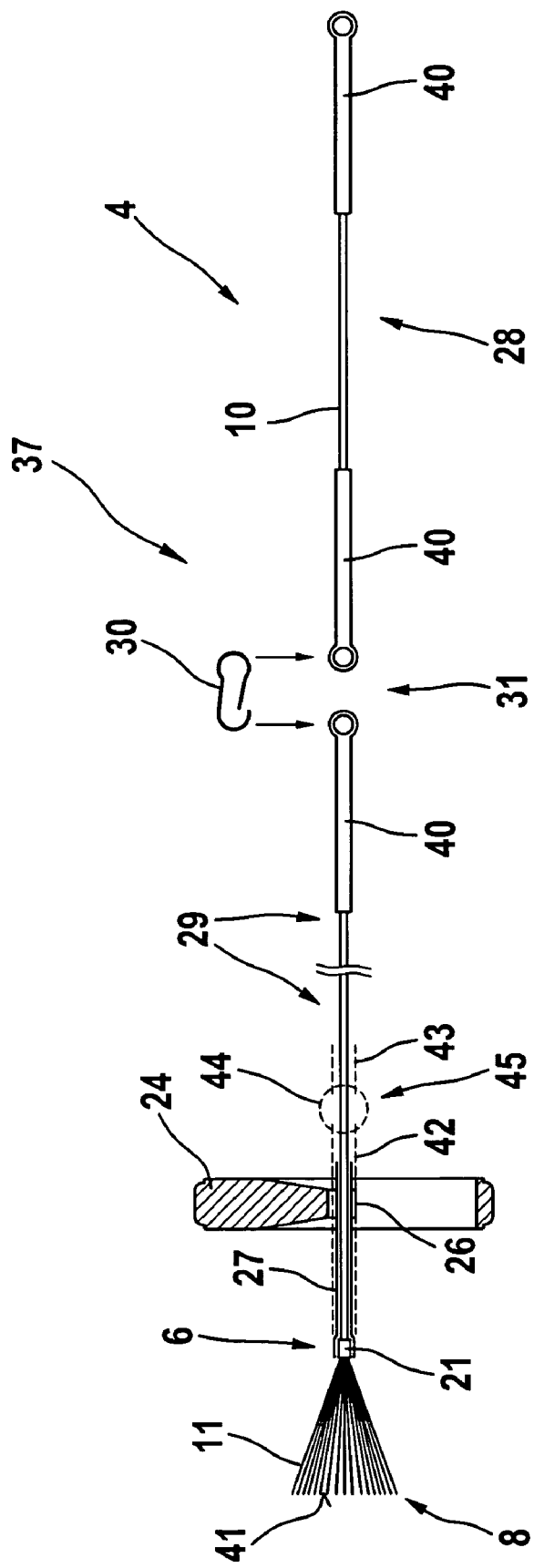
FIG. 11 is a composite illustration of the split potential compensation conductor of FIG. 2 with the positioning ring of FIGS. 8 to 10.

The composite illustration of FIG. 11 shows the two-part potential compensation conductor 4 of FIG. 2 together with the positioning ring 24. At the separation location 31, the potential compensation conductor 4 is split into two parts in such a way that two pieces, 28, 29 are formed. At their facing ends, the two pieces 28, 29 are provided with a pressed-on annular sleeve 40 through which a carabiner hook 30 is guided for the detachable connection of the two pieces 28, 29. In place of the carabiner hook 30, other suitable connecting elements could also be provided, by means of which an electrically conductive and releasable connection of the two pieces 28, 29 is made possible. At its free end, the piece 28 is provided with a further pressed-on annular sleeve 40, by means of which it can be fixed in position on the motor mounting bolt 13 in accordance with FIG. 2.

In the region of the free end 6, at a distance from a sectional plane 41, the squeezing sleeve 21 is placed and pressed onto the piece 29. At the conclusion of the pressing process of the squeezing sleeve 21, the second piece 29, which is made of a continuous material of the steel wire 10, is cut to length at the section plane 41. The free ends 46 of the wires 47 (FIG. 7) are formed at the sectional plane 41. The nature of the steel wire 10 is such that its strands 11, under the effect of this cutting, automatically untwist to form the spider 8. In this connection, the squeezing sleeve 21 acts as a stop element for the automatic untwisting process, and is disposed centrally in the spider 8.

In the region of its free end 6 that adjoins the spider 8, the potential compensation conductor 4 is covered by a hose of polymeric material, which in the illustrated embodiment is in the form of a shrunk-on hose 27. The hose 27 is guided through the positioning ring 24, and together with the second piece 29 is held in the snap clamp 26. In the opposite direction, the shrunk-on hose 27 is guided in a protecting manner to over the squeezing sleeve 21 to cover the same.

The schematic perspective view of FIG. 12 shows an embodiment where the potential compensation conductor 4 is bent from a spring wire. The potential compensation conductor 4 extends on the inner side of the blower tube 3, which in order to facilitate illustration is shown in dashed lines, to the region of the free end 6. In the region of the free end 6, initially a first lengthwise section 52 is provided that extends parallel to the longitudinal axis 48 and that merges into a first semicircular section 53 that extends in the peripheral direction. There then follows a second lengthwise section 54 and a second semicircular section 55, which in turn merges into a radial section 56 that extends radially relative to the longitudinal axis 48. The two semicircular sections 53, 55 have an over dimensioned semicircular shape relative to the round cross-sectional shape of the blower tube 3, as a consequence of which, in the installed state, these semicircular sections are retained in the blower tube 3 by radial spring tension. The two semicircular sections 53, 55 and the lengthwise sections 52, 54 are disposed against the inside of the wall 50 of the blower tube 3. Due to the two semicircular sections 53, 55, two support locations 57, 58 are formed that are axially offset from one another relative to the longitudinal axis 48. Instead of the illustrated semicircular shape of the sections 53, 55, other bent or curved contours could also be suitable for bringing about a reliable spatial fixation relative to the wall 50 of the blower tube 3.

A short, axially oriented section is also provided at the radially inner end of the radial section 56. Secured to the free end of this short section is the charge compensation element 38, which is formed by a plurality of wires 47 and has a central axis 51 that is approximately coaxial with the longitudinal axis 48 of the blower tube 3. In the illustrated embodiment, the wires 47 are arranged in the shape of a conical broom. The two, axially spaced-apart support locations 57, 58 support the charge compensation element in the radial direction and also against tilting or fluttering of the central axis 51.

The schematic illustration of FIG. 13 shows a further embodiment, according to which the potential compensation conductor 4 extends on the outside of the wall 50 of the blower tube 3. To form the charge compensation element 38 that is connected thereto, a single wire 47 is provided that is guided radially inwardly from the outside through the wall 50 of the blower tube 3, with the loose or free end 46 of the wire 47 being disposed close to the longitudinal axis 48 of the blower tube 3.

In the further preferred embodiment of FIG. 14, the potential compensation conductor 4 is integrated into the wall 50 of the blower tube 3. For this purpose, an electrical conductor or wire that is injected into the polymeric material of the blower tube 3, or an electrically conductive coating that is applied to the inside or the outside surface, can be provided. The charge compensation element 38 is formed by wires 47 that are grouped together in the manner of a broom and that are arranged in a form of a flat or planar fan. To facilitate illustration, the fan is shown slightly rotated, although it is preferably disposed such that its plane extends transverse to the direction of flow, whereby the free ends 46 are distributed over the flow cross-section.

In addition to the central axis 51 of the charge compensation element extending perpendicular to the longitudinal central axis 48 of the blower tube as shown, a coaxial or inclined arrangement can also be expedient.

Figure 15:
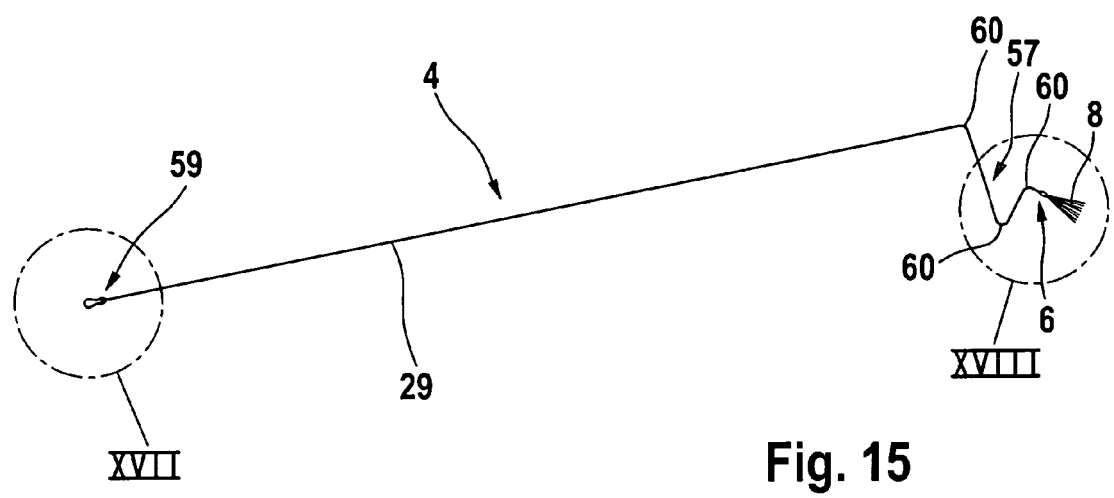
FIG. 15 illustrates a further embodiment of the potential compensation conductor made of a spring wire having linearly extending pieces.

FIG. 15 illustrates a further embodiment of a piece 29 of the potential compensation conductor 4 that includes the free end 6. The piece 29 is formed from a spring wire that is angled off at a total of three bend locations 60. Between and beyond the bend locations 60, the individual sections of the spring wire extend essentially linearly. The bend locations 60 are disposed in the vicinity of the free end 6 of the potential compensation conductor 4, and are spatially oriented in a three-dimensional manner, thereby forming a support location 57. The spider 8 is secured at the free end 6. The region of the free end 6 having the spider 8 is designated as the detail XVIII and is shown in detail in FIG. 18, whereas the detail XVII at the opposite end 59, at the motor side, is illustrated in detail in FIG. 17.

Figure 16:
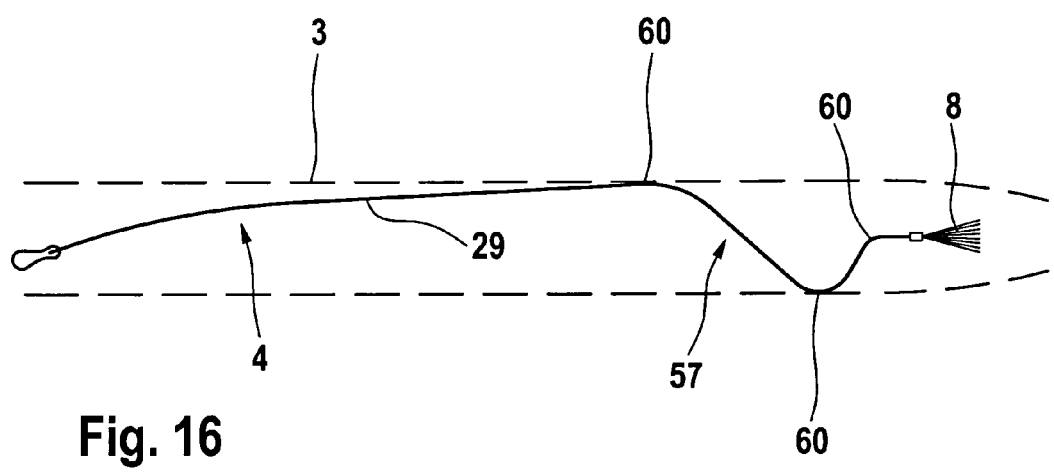
FIG. 16 is a diagrammatic view of the blower tube with the potential compensation conductor of FIG. 15 elastically deformed and retained therein.

The spatial angles of the bend locations 60 are selected such that in the elastically deformed and installed state of FIG. 16, the spider 8 is centrally disposed in the blower tube 3. The bend locations 60, and the linear wire sections disposed between them, undergo a bending deformation that supports the support location 57 against the inside of the blower tube 3 in an elastically resilient manner in all spatial directions.

Figures 17, 18:
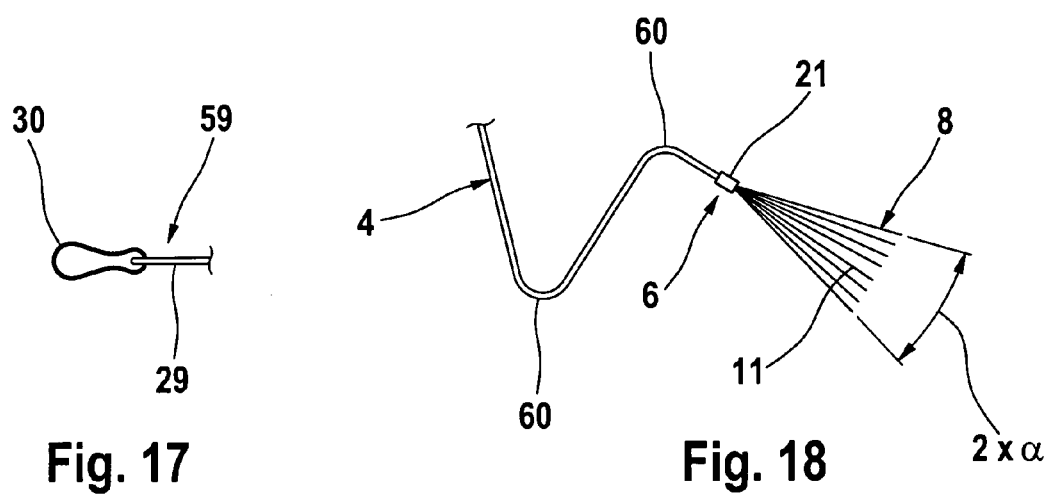
FIG. 17 is an enlarged detailed view of the encircled detail XVII of FIG. 15 with details showing a fastening carabiner.
FIG. 18 is an enlarged detailed view of the encircled detail XVIII of FIG. 15 illustrating the spider which is shaped to form a conical broom from individual wire strands.

The detailed view of FIG. 17, which shows the detail XVII of FIG. 15, shows that the spring wire of the piece 29 is bent to form an eye at the motor-side end 59 and holds a carabiner hook 30. In this way, a detachable connection is produced in conformity with the illustration of FIG. 2 at the separation location 31 shown therein.

The detail XVIII of FIG. 15 is shown in the enlarged view of FIG. 18, according to which the bend locations 60 are bent in a rounded manner having a radius. The spider 8 is formed by untwisted strands 11 of a stranded wire and is secured to the free end 6 of the potential compensation conductor 4 via a squeezing sleeve 21. The strands 11 of the spider 8 are untwisted to form a cone having an opening angle of $2 \times \alpha = 30°$, according to which the half conical opening angle $\alpha$ is approximately 15°. The preferred half conical opening angle $\alpha$ is in the range of the value of $\alpha = 15°$ shown here up to the value of $\alpha = 80°$ shown in FIG. 7.

In addition to the conical or fan-shaped arrangements of the wires 47 illustrated in the various embodiments, a broom shape having an irregularly distributed wire arrangement can also be advantageous. Although the illustrated embodiments represent preferred combinations of features, it can also be advantageous to configure the individual features that have been disclosed in any other desired combination.

The specification incorporates by reference the disclosure of German priority document 10 2005 007 675.0 filed Feb. 19, 2005.

The present invention is, of course, in no way restricted to the specific disclosure of the specification and drawings, but also encompasses any modifications within the scope of the appended claims.

We claim:

1. An apparatus comprising:
   a blower fan,
   a motor for driving the blower fan, wherein the motor is a combustion engine,
   a blower tube for conveying an air stream from said blower fan, and
   a potential compensation device that is electrically connected with said motor, wherein said potential compensation device includes a charge compensation element, and wherein said charge compensation element has a free end that projects in an exposed manner into said air stream at a position that is spaced from said blower tube.

2. The apparatus according to claim 1, wherein said free end of said charge compensation element is disposed in said air stream within said blower tube.

3. The apparatus according to claim 1, wherein said charge compensation element is disposed at least approximately in the region of a free end of said blower tube, wherein said potential compensation device further includes a potential compensation conductor, and wherein said charge compensation element is electrically connected with said motor via said potential compensation conductor.

4. The apparatus according to claim 3, wherein at least said free end of said charge compensation element projects out of said free end of said blower tube.

5. The apparatus according to claim 1, wherein said charge compensation element is in the form of a flexible wire.

6. The apparatus according to claim 5, wherein said wire is a bare, stainless steel wire.

7. The apparatus according to claim 5, wherein said charge compensation element is formed by a plurality of wires that are grouped together in a broom-like manner, and wherein each of said wires has a free end.

8. The apparatus according to claim 7, wherein said wires that are grouped together in a broom-like manner form an electrically conductive spider having legs that extends radially outwardly in a ray-shaped manner, relative to a longitudinal axis of said blower tube.

9. The apparatus according to claim 8, wherein said legs are disposed in a cone-shaped manner.

10. The apparatus according to claim 9, wherein said cone shape of said legs has a half cone opening angle of a minimum of approximately 15° and a maximum of approximately 80°.

11. The apparatus according to claim 7, wherein said wires that are grouped together in a broom-like manner are formed by individual strands of an untwisted steel wire.

12. The apparatus according to claim 11, wherein said steel wire is a potential compensation conductor of said potential compensation device.

13. The apparatus according to claim 1, wherein a positioning ring is disposed in said blower tube, and wherein said charge compensation element is positioned by means of said positioning ring.

14. The apparatus according to claim 13, wherein said positioning ring is provided with at least one radially inwardly projecting positioning arm, and wherein said positioning arm is provided with a snap clamp for a potential compensation conductor of said potential compensation device.

15. The apparatus according to claim 1, wherein said potential compensation device further includes a potential compensation conductor, and wherein at least a portion of said potential compensation conductor extends on the inside of said blower tube.

16. An apparatus comprising:
   a blower fan,
   a motor for driving the blower fan,
   a blower tube for conveying an air stream from said blower fan, and
   a potential compensation device that is electrically connected with said motor, wherein said potential compensation device includes a charge compensation element, and wherein said charge compensation element has a free end that projects in an exposed manner into said air stream, wherein said potential compensation device further includes a potential compensation conductor, and wherein at least a portion of said potential compensation conductor extends on the inside of said blower tube, and wherein at least a portion of said potential compensation conductor is formed by a spring wire that in the region of a free end thereof is bent to form at least one support location that is retained in said blower tube.

17. The apparatus according to claim 16, wherein said spring wire is provided with two support locations that are axially offset relative to one another.

18. An apparatus comprising:
   a blower fan,
   a motor for driving the blower fan,
   a blower tube for conveying an air stream from said blower fan, and
   a potential compensation device that is electrically connected with said motor, wherein said potential compensation device includes a charge compensation element, and wherein said charge compensation element has a free end that projects in an exposed manner into said air stream, wherein said potential compensation device furthermore includes a potential compensation conductor, and wherein at least a portion of said potential compensation conductor is integrated into a wall of said blower tube.

19. An apparatus comprising;
   a blower fan,
   a motor for driving the blower fan,
   a blower tube for conveying an air stream from said blower fan, and
   a potential compensation device that is electrically connected with said motor, wherein said potential compensation device includes a charge compensation element, and wherein said charge compensation element has a free end that projects in an exposed manner into said air stream, wherein said potential compensation device furthermore includes a potential compensation conductor, and wherein at least a portion of said potential compensation conductor extends on an outer side of said blower tube.

* * * * *